UNITED STATES PATENT OFFICE.

JULES GARNIER, OF PARIS, FRANCE.

PROCESS OF REFINING COPPER.

SPECIFICATION forming part of Letters Patent No. 421,046, dated February 11, 1890.

Application filed April 4, 1889. Serial No. 306,005. (No specimens.)

*To all whom it may concern:*

Be it known that I, JULES GARNIER, of the city of Paris, France, have invented an Improved Process of Refining Copper, of which the following is a full, clear, and exact description.

My invention relates to an improved process of refining impure copper by the direct action of carbon, a high temperature, an excess of air, and extra basic fluxes, whereby either copper or an alloy of copper is obtained which is malleable, and is distinguished by the presence of a small quantity of carbon and the absence of metallic oxides. Commercial copper, native copper, cement copper, and calcined mattes, all of which contain more or less arsenic, sulphur, and antimony, are especially suited for treatment by my process.

The furnace in which the process is carried on should possess the following essential features:

First. The furnace should be of nearly cylindrical form in section and of small diameter relatively to its height.

Second. The furnace should be water-jacketed—that is to say, cooled externally by water flowing in contact with the metal plates of the casing of the inner lining.

Third. The inner lining should not yield silica, and should therefore consist of basic or neutral substance, such as chrome-iron; or if the lining be silicious it should be cooled to such an extent that a false lining will be formed by the setting of a portion of the charge by the cooling due to the active circulation of the water.

Fourth. The tuyeres should be arranged either at one level or in several superposed horizontal planes, the latter arrangement facilitating the elimination of certain substances—such as tellurium, arsenic, and antimony—which is a special object of the treatment.

Fifth. The blast should be raised to as high a temperature as possible, in order that the slag may be extra basic.

The cupreous matters to be refined are charged conjointly with the coke and fluxes, which may consist of lime, dolomite, baryta, plus a certain quantity of silica, regard being had to that contained in the ash of the fuel. Instead of crude silica, there may also be employed cupreous scoria or certain rich copper ores of known composition. It is necessary that the slag should contain at least sixty per cent. of bases, and that its weight per ton of the charge of copper should be in proportion with the amount of the substances to be eliminated. To facilitate the formation of and impart fluidity to this extra basic slag, fluor-spar may be added with advantage to the charge. Certain metallic oxides—such as oxide of manganese—may also enter into consideration in the formation of the above-mentioned slag, it being, however, observed that, according to the particular conditions of the whole operation, a greater or less portion of the metal added in the state of oxide will pass into the refined copper.

The product obtained in the above-described operation consists, according to the nature of the charge, either of pure copper or copper more or less alloyed with other metals and possessing sufficient malleability to be directly utilizable for various purposes. The distinguishing feature of these products, as compared with those obtained by the various methods of refining now in use, lies in the fact that the copper is free from metallic oxides, and that it always contains a small proportion of carbon and silicon, as well as the metals derived from the bed of fusion.

I claim—

The process of desulphurizing coppers which consists in subjecting them in the presence of carbon to fusion in a basic-lined furnace in the presence of a basic slag, thereby producing a reducing and not an oxidizing action, the basic slag used being composed of about seventy per cent. of base and thirty per cent. of silica and of fluor-spar, as herein described, and for the purpose specified.

The foregoing specification of my improved process of refining copper signed by me this 11th day of March, 1889.

JULES GARNIER.

Witnesses:
R. J. PRESTON,
ALBERT MOREAU.